United States Patent

[11] 3,574,463

| | | |
|---|---|---|
| [72] | Inventors | Nicky R. Jackowski;<br>Peter W. Higgins, Houston, Tex. |
| [21] | Appl. No. | 843,956 |
| [22] | Filed | July 23, 1969 |
| [45] | Patented | Apr. 13, 1971 |
| [73] | Assignee | Tideland Signal Corporation<br>Houston, Tex. |

[54] APPARATUS FOR ALIGNING LAMPS IN A LANTERN
12 Claims, 10 Drawing Figs.

[52] U.S. Cl. .................................................. 356/123, 240/3
[51] Int. Cl. ..................................................G01m 11/02, F21q 3/02
[50] Field of Search........................................... 240/3, 6, 11.4, 10.69, 22, (Inquired); 356/121, 122, 123, (Inquired)

[56] References Cited
UNITED STATES PATENTS

| | | | |
|---|---|---|---|
| 1,461,187 | 7/1923 | Harrington.................... | 356/122 |
| 1,688,619 | 10/1928 | Handlan....................... | 356/123X |
| 1,810,036 | 6/1931 | Werner ........................ | 356/123 |

*Primary Examiner*—Louis R. Prince
*Assistant Examiner*—William A. Henry, II
*Attorneys*—James F. Weiler, Jefferson D. Giller, William A. Stout and Paul L. De Verter, II ABSTRACT: A lamp focus fixture for inserting in a lamp holder in a lantern having a lens and lamp focusing indicators for aligning the lamp in the lens. A focus fixture including a flange which is shaped and sized in circumference and thickness the same as the flange of the lamp to be aligned whereby the fixture flange will fit into the lamp holder in the same position as the lamp and a sighting indicator secured to the flange and spaced from the bottom of the flange a distance equal to the distance between the midpoint of the filament to the bottom of the flange of the lamp. A base secured to the bottom of the flange having the same size and shape as the lamp to be aligned. The flange including openings for receiving electrical pins. A focusing indicator having optics to compensate for the optics of the lantern lens and having telescopic lens for magnification and crosshair sighting for greater accuracy.

PATENTED APR 13 1971

Nicky R. Jackowski
Peter W. Higgins
INVENTORS

BY
ATTORNEYS

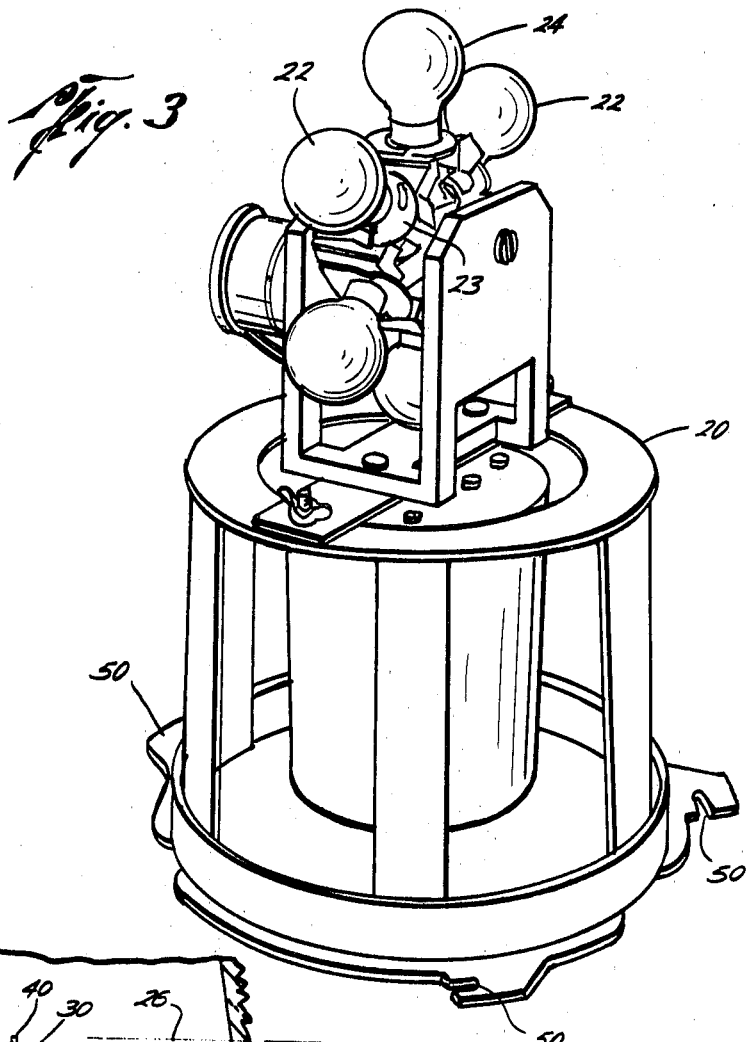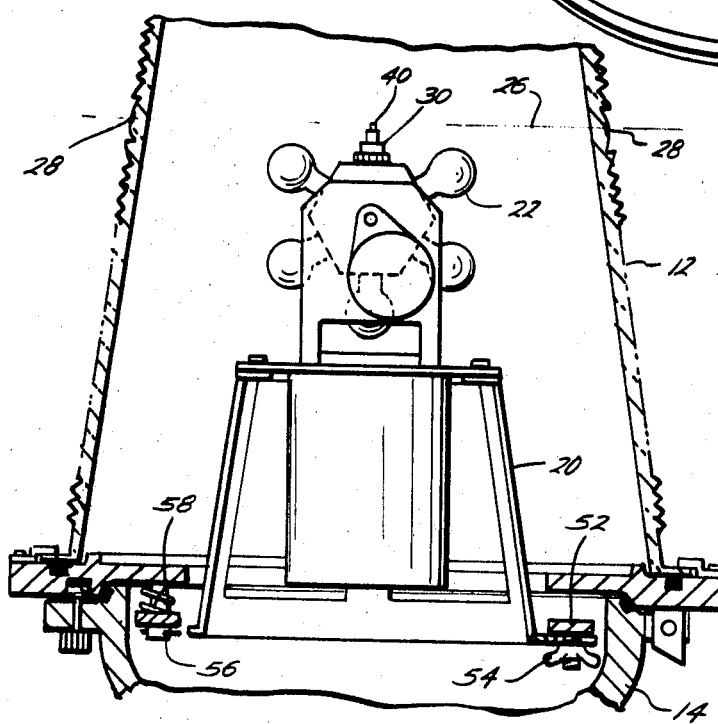

PATENTED APR 13 1971 3,574,463
SHEET 3 OF 4
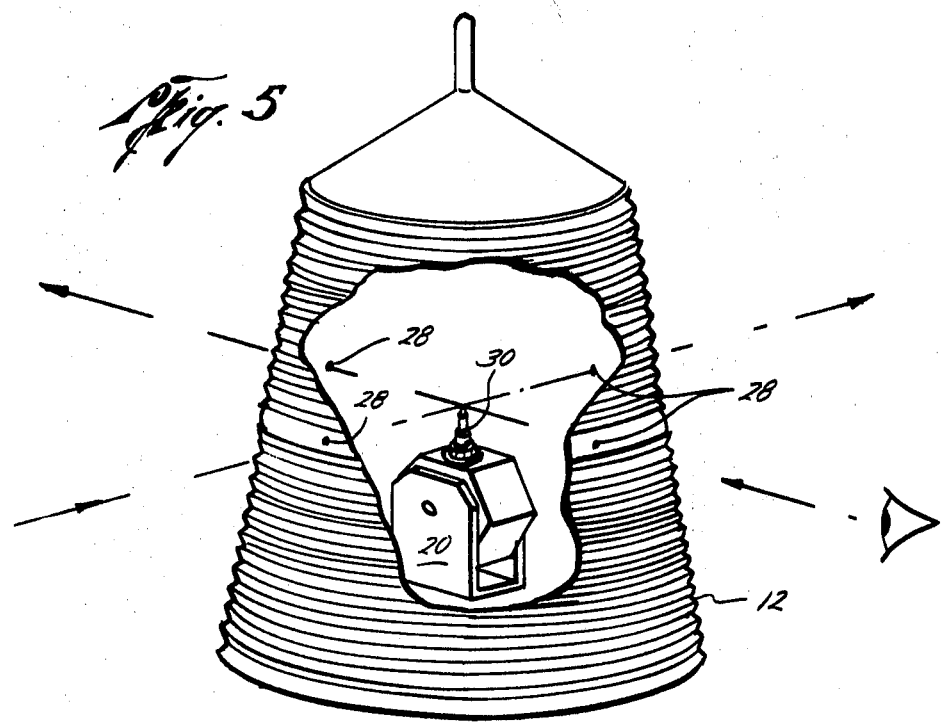
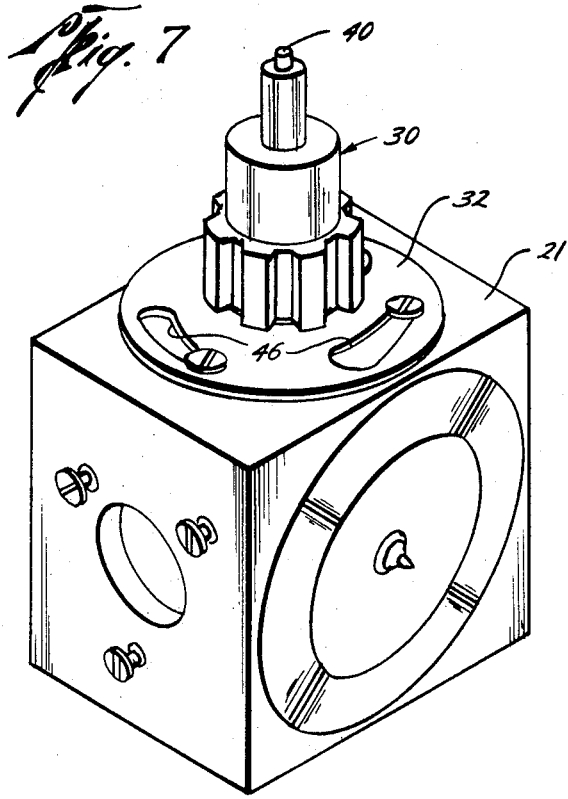
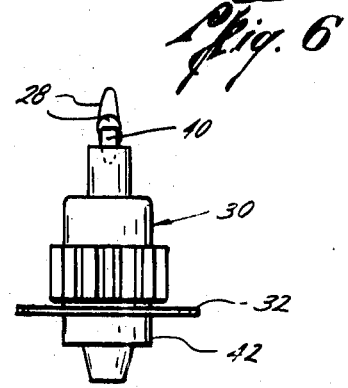
Nicky R. Jackowski
Peter W. Higgins
INVENTORS
BY James F. Weiler
William A. Stout
ATTORNEYS

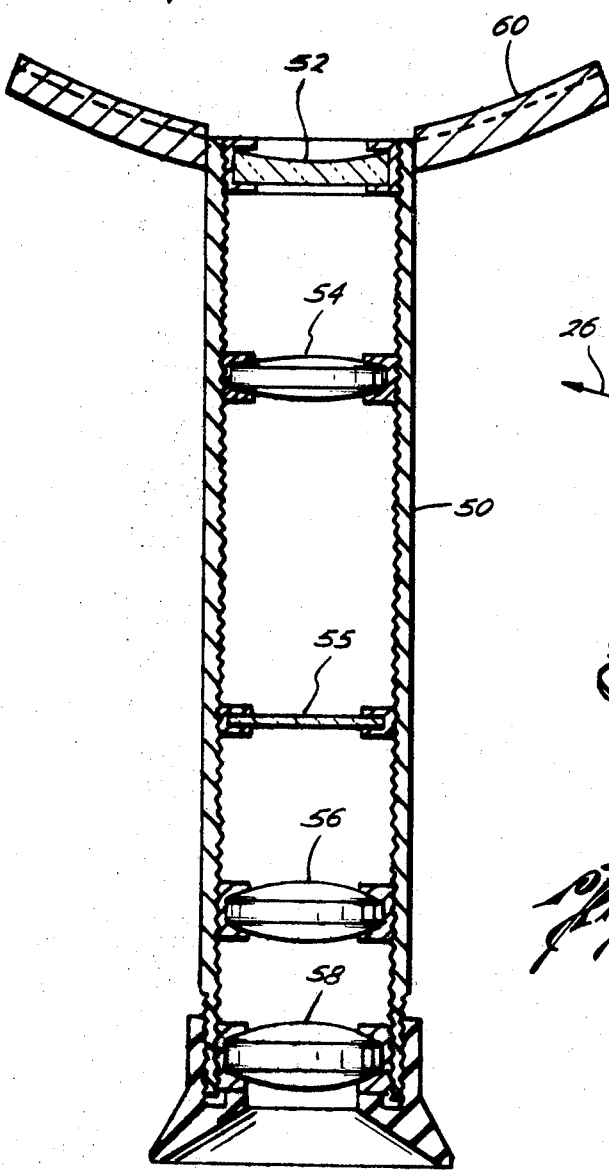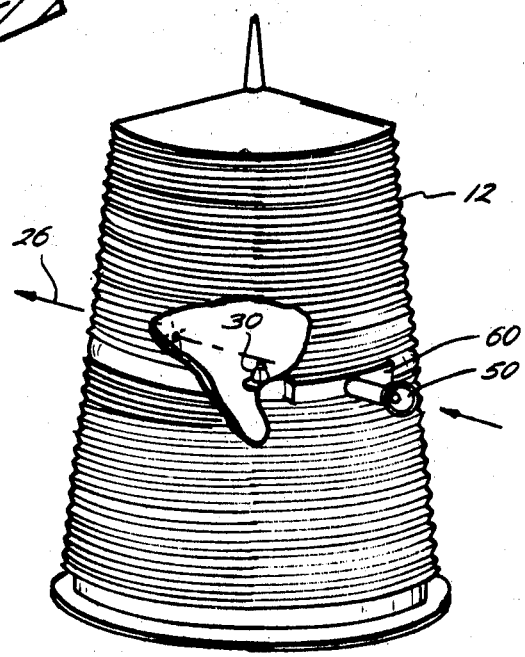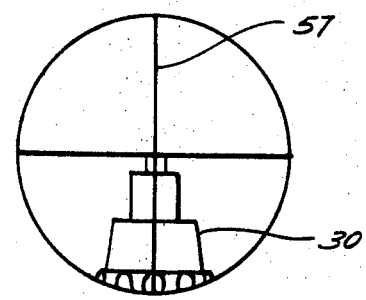
Nicky R. Jackowski
Peter W. Higgins
INVENTORS

APPARATUS FOR ALIGNING LAMPS IN A LANTERN

BACKGROUND OF THE INVENTION

It is important in a prefocused lantern, such as a marine, railroad or airport lantern, to position the lamp in the correct focal position with respect to the lens. Variation from the correct positioning of the lamp by as much as one thirty-second of an inch will cause improper focusing, the loss of light intensity, and vertical displacement of the lamp will tilt the beam thereby directing the light either upwardly in the sky or downwardly into the ground or the sea thereby directing the light away from the observer's eye.

Generally, the lens of a lantern, such as a marine lantern, has focus indicators such as dots circularly positioned 90° apart on the focal plane of the lens whereby the installer may sight across opposite pairs of focus indicators to attempt to align the lamp in the correct position in the lens. However, this is difficult to accomplish. First, the glass envelope surrounding the lamp creates distortion and optical illusions since the glass envelope has a curved surface and has a variable wall thickness, the center of the filament is not at the vertical center of the envelope, and the envelope is serrated and does not have a ripple free surface. Since the far side focus dot must be aligned by sighting entirely through the envelope, and since the lamp filament must be observed through one side of the envelope, the glass envelope visually moves and distorts the image of both the far side focus indicator and the filament preventing their accurate alignment with the focal point of the lens.

One of the features of the present invention is directed to overcoming the problems in aligning a lamp in the lens of a lantern by providing a focus fixture which may be temporarily placed in the lamp holder in place of a lamp and which includes a sighting indicator or target located a distance from a base flange equal to the distance of the midpoint of a lamp filament from its base flange. The mixture can then be used, without the interference of any glass envelope, to define the exact point on which to focus whereby the lamp holder may be adjusted to its correct position and the lamp may be inserted in place of the fixture.

Another cause of misfocus is, because of the nature of the lens, that the lamp, its filament and the far side focusing indicator, appear considerably elongated. Since it is desired to locate the midpoint of the filament in the focal point of the lens, elongation makes it difficult to visually locate the top and bottom of the filament support with the result that the lamp filament is misadjusted and misfocused and the beam is misdirected. While the elimination of the lamp and the substitution of the focus fixture reduces this latter cause of misfocus, another feature of the present invention is the provision of an optic system to compensate for the curvature of the center optic of the lantern lens thereby overcoming the visual elongation usually observed when aligning the lamp.

And in order to provide still more accuracy in alignment, the focus indicator may be telescopic lens providing greater magnification and a crosshair reticle for greater accuracy than the conventional focus dots.

SUMMARY

One of the features of the present invention is directed to providing a focus fixture which can be used instead of a lamp to indicate the alignment of the lamp holder with reference to the lens.

The focus fixture of the present invention takes advantage of the fact that lamps for lanterns with a focal point are manufactured from a specification which requires that the midpoint of the lamp filament be located at a fixed distance from the bottom of the lamp mounting flange, in the case of marine lanterns generally 1⅛-inch. The focus fixture of the present invention is provided with generally a mounting flange having the same size and shape as a lamp mounting flange and with a sighting indicator or target located at the same distance from the mounting flange as the distance between the midpoint of the filament and the flange of a lamp. Thus the top of the target can be focused through the focus indicators on the lens without the disadvantage of having a glass envelope distort either the focus indicators or the sighting indicator.

Since the lamp holder may vary from one type to another, another feature of the present invention is to provide a focus fixture having a mounting flange and base similar in size and shape to the mounting flange and base of a lamp. Thus the mounting fixture will fit all lamp holders and when placed in position in a lamp holder will be subject to the same holding and gripping forces as a lamp. The fixture will then be aligned in the same holding position as a lamp thereby providing an accurate alignment of the lamp holder.

Another feature of the present invention is the use of an optic system to compensate for the curvature of the center optic of the lantern lens whereby the elongation observed when visually sighting through the lens is avoided.

In addition, a focusing telescope may be used to provide magnification to more accurately align the focus indicators with the focus fixture and may include a crosshair reticle as the focus indicator for still greater accuracy.

BRIEF DESCRIPTION OF THE DRAWINGS

FIG. 3 is an enlarged perspective view of a lamp changer for the lantern, FIG. 4 is a fragmentary elevational view, partly in cross section, illustrating the positioning of a lamp changer having a focus fixture of the present invention in a lens, FIG. 5 is a perspective view, partly in cross section, illustrating the method of aligning a lamp holder utilizing the present invention, FIG. 6 is an enlarged view illustrating the method of aligning the focus dots on the lens of a lantern using the focus fixture of the present invention, FIG. 7 is an enlarged perspective fragmentary view illustrating the mounting of the focus fixture of the present invention on another type of lamp changer, FIG. 8 is an enlarged elevational view of a combined compensating optic system and telescope for use as a focusing indicator, FIG. 9 is a perspective view, partly in cross section, illustrating the method of aligning a lamp holder using the focus fixture of FIG. 2 with the focusing indicator of FIG. 8, and FIG. 10 is an enlarged view illustrating the method of aligning the focus fixture using the telescopic-type focusing indicator of the present invention.

DESCRIPTION OF THE PREFERRED EMBODIMENT

Figures 1, 2:
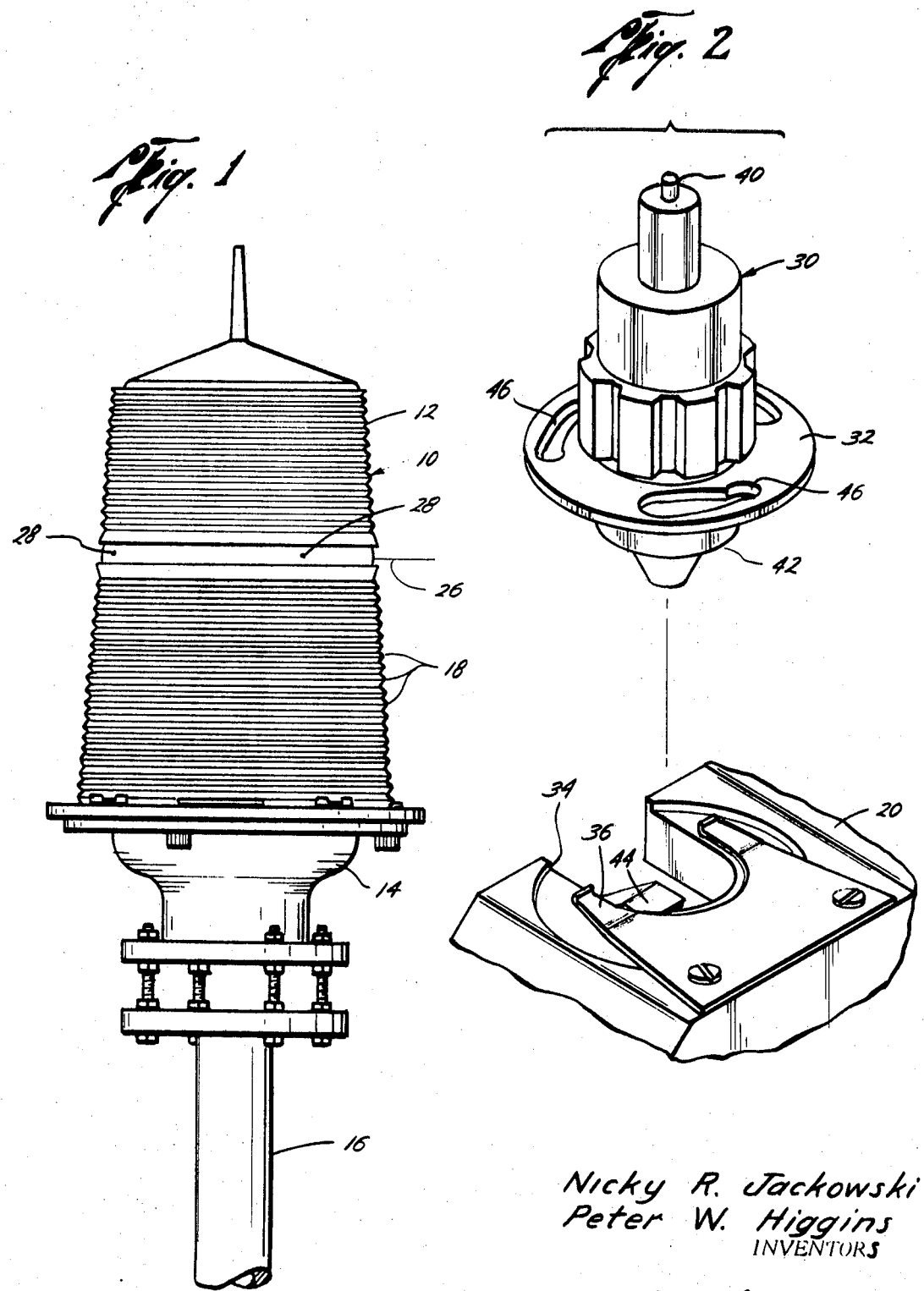
FIG. 1 is an elevational view of a lantern.
FIG. 2 is an enlarged exploded, perspective and partly fragmentary view showing the focus fixture of the present invention and part of the lamp receiving structure of a lamp holder.

Referring now to FIG. 1, the numeral 10 generally indicates a lantern, by way of illustration only, a marine lantern such as used to mark buoys, navigational structures, and obstructions and generally includes a lens 12, a base 14, a support 16 and suitable adjusting means 18 for leveling the lens 12.

In addition, and referring to FIG. 3, the lantern 10 also includes, positioned interiorly of the lens 12 a lamp holder 20, here shown as a lamp changer having a plurality of lamps 22 which are automatically and sequentially rotated into the lamp position 24 when the lamp in that position burns out.

Referring again to FIG. 1, the lens 12 includes a suitable configuration for directing light therefrom from the lamp in position 24 (FIG. 3) in a horizontal plane and may be of any suitable material such as an acrylic plastic having a plurality of lens elements 18 on the outer surface thereof and which is precisely made so that the lens 12 has an optical system to provide a narrow beam of light therefrom emanating horizontally in all directions from a focal plane 26. Focus indicators such as focus dots 28 are positioned on the focal plane 26 at 90° intervals and thus the installer generally sights across opposite focus dots 28 and through the midpoint of the filament of the lamp in position 24 to suitably adjust and align the lamp holder 20 in an attempt to properly align the lamp on the focal plane of the lens 12.

However, small deviations of the midpoint of the lamp filament from the focal plane 26 cause improper focusing and the loss of light intensity and misdirects the light from the lens 12. At the present time it has been difficult to accurately accomplish focusing of lanterns. One of the major causes of misfocus is caused by the distortion and optical illusions caused by viewing through the glass envelope of the lamp 22 since the installer looks through the lens 12 through one pair of oppositely positioned focus dots 28 and by sighting through the envelope of a lamp 22 attempts to adjust the midpoint of the lamp filament in his line of sight. However, the glass envelope of lamp 22 has a curved surface and has a variable wall thickness, the center of the filament is not at the vertical center of the envelope, and the envelope does not have a ripple free surface, all of which causes distortion and optical illusions since the lamp filament and far side focus dot must be viewed through the envelope.

A second cause of misfocus is that due to the nature of the lens 12, and when viewing a lamp 22 through the focus dots 28, the lamp appears considerably elongated thereby making the stop and bottom of the filament support hard to observe whereby the installer has difficulty in properly judging where the midpoint of the filament actually is.

One feature of the present invention is directed to providing a focus fixture which is inserted in lamp position 24 and in place of a lamp 22. Thus referring to FIGS. 2, 4, 5, 6 and 7, a focus fixture is provided generally indicated by the reference numeral 30 which has a mounting flange configuration similar to that of a lamp 22 which is to be aligned so that the fixture 30 may be used in place of a lamp 22 to align the position of the lamp holder 20 under the same conditions as a lamp.

Thus, the focus fixture 30 includes a flange 32 having the same circumference and thickness as the mounting flange 23 (FIG. 3) of a lamp 22. Thus, referring to FIG. 2, the flange 32 of the focus fixture 30 will fit into the mounting recess 34 of the lamp holder 20 and will be held in place therein by the spring flange 36 in a manner identical to that of a lamp 22. Thus, the flange 32 of the fixture 30 may be positioned in the lamp holder 20 in the identical position of a lamp. The focus fixture 30 also includes a sighting indicator 40 connected to and supported by the flange 32. The accuracy of the focus fixture is made possible by the fact that lamps 22 are manufactured from a specification which requires that the midpoint of the filament be located a fixed distance from the bottom of the lamp's mounting flange, in the case of marine lanterns generally 1⅛ inches. Therefore, the top of the sighting indicator or target 40 is located at the same distance, 1⅛ inches. for the lamps presently in use, from the bottom of its mounting flange 32. Thus the top of the sighting indicator or target 40 may be focused upon by an installer through the normal focus dots 28 with the advantage that there is no glass envelope to distort the focus marks, and the target represents the exact midpoint of a filament and defines the point on which to focus and the point at which the midpoint of the lamp filament should be located.

In order to further insure that the focus fixture 30 will assume the identical position in the lamp holder 20 the fixture 30 may include, as best seen from FIGS. 2 and 5, a base 42 geometrically identical to the base of a lamp. Thus, when the fixture 30 is inserted into the lamp holder 20, electrical spring flange 36 acting downwardly on the top of the flange 32 and the electrical spring contact 44 acting upwardly on the base 42 will act on the focus fixture 30 in the same manner as if it were a lamp 22.

Referring now to FIG. 7, a different type of lamp holder 21 is shown and for this type of lamp holder the flange 32 of the focus fixture 30 must include the electrical pin holding openings 46 which are identical to the openings in the flange of a lamp 22. Of course, with the lamp holder 20 of FIG. 2, the electrical pin holding openings 46 are not needed since the electrical flange 36 provides the necessary electrical contact.

As previously mentioned, one cause of misfocus is due to the curvature of the lens 12 which elongates objects viewed therethrough. In order to correct this latter cause of misfocus, and in addition to provide magnification thereby increasing accuracy, a focus telescope 50 may be provided. Any suitable optical system may be used such as a Galilean, astronomical, terrestrial, or prism ocular telescope. By way of example only, telescope 50 illustrates a terrestrial type having a lens element 52 which is configured to compensate for the curvature of the center optic of the lens 12 thereby allowing a line of sight into the lens 12 which is undistorted by the lens 12. Lens 54, 56, and 58 form a conventional terrestrial telescope to produce an erect and magnified image. At the focus of the objective lens 54 may be located a reticle 55 having crosshairs 57 thereon to locate the line of sight through the focal plane 26 of the lens 12.

Attached to the telescope 50 are mounting ears 60 having faces which are contoured to coact and mesh with the exterior surface of the center optic of the lens 12. Thus the telescope may be snugly inserted into the center optic groove on the lens 12, as shown in FIG. 9, so that only one position of the ears 60 in the groove is possible. When in position, the optics of the telescope 50 and in particular the crosshairs 57 on the reticle 55 are aligned so that the line of sight always passes through the focal point 26 of the lens 12. Thus, and referring to FIGS. 9 and 10, the telescope 50 is applied to the outside of the lens 12 and by sighting therethrough, a view such as shown in FIG. 10 is obtained showing the relationship of the crosshairs 57 to the focus fixture 30. Two sightings with the telescope 50 at 90° is required for proper adjustment of the focus fixture 30.

It is to be noted that if magnification is not required, only the correction lens 52 is required to correct for the elongation observed in making sightings through the lens 12. However, the telescope 50 may be substituted for the dots 28 as a focusing indicator and has the advantage of providing magnification to provide increased accuracy. Furthermore the use of crosshairs 57 provides a finer sighting than the dots 28 on the lens 28 thereby further increasing the accuracy. Of course, the crosshairs 57 may be omitted and the dots 28 used for sightings with a telescope.

In use, the focus fixture 30 of the present invention is installed in position 24 (FIG. 3) of a lamp holder 20, such as a lamp changer, and the lamp changer 20 is then inserted into the lens 12 (FIGS. 4 and 5). The engaging brackets 50 on lamp holder 20 are secured to a focus ring 52 by means of suitable wingnuts 54 (FIG. 4). The installer then views through the focal plane 26 of the lens 12 through a focusing indicator such as opposing focus dots 28 as shown in FIG. 5. If the focus fixture 30 is correctly aligned, the installer will have a view similar to that in FIG. 6 (the far side focus dot may appear elongated as shown). However, if the fixture 30 is not correctly aligned thereby indicating that the lamp changer 20 is out of alignment, the installer will open the base of the lantern 10 and adjust the focus screws 56 (FIG. 4) which are circumferentially positioned around the focus ring 52. The focus ring 52 is yieldably urged downwardly by gravity and by springs 58, into proper aligned position and adjustment of the focus screws 56 adjusts the position of the holder 20 to tilt, raise or lower the target 40 into the correct position. After the lamp holder 20 is properly aligned, the lamp holder may be removed by wingnuts 54, the focus fixture 30 may be removed, and lamp 22 installed in its place and the lamp changer 20 reinstalled without disturbing the position of the focus ring 52 and the focus of the system.

Another type of focusing indicator is the optic telescope 50 which may be used to align the focus fixture 30. As best seen in FIGS. 9 and 10, the telescope 50 is placed on the external surface of the center optic of the lens 12 on the focal plane 26 whereby the line of sight of the telescope 50 passes through the focal plane of the lens 12. Using the telescope the focus fixture 30 is adjusted to the position shown in FIG. 10 which shows the tip of the fixture 30 at the intersection of the crosshairs 57. Two sightings at 90° intervals performed for complete adjustment. In using the telescope 50 the focus dots 28 on the lens 12 are not needed.

The present invention, therefore, is well adapted to carry out the objects and attain the ends and advantages mentioned as well as others inherent therein.

We claim:

1. In combination with a lantern having a lens with a focal point and lamp focusing indicator means and a lamp holder adjustably mounted therein, a focus fixture comprising:
   a mounting flange sized and shaped to fit in the lamp holder in place of a lamp;
   a sighting indicator secured to the flange and spaced from the bottom of the flange a distance equal to the distance from the midpoint of the filament to the bottom of the flange of a lamp adapted to be secured in a lamp holder.

2. The apparatus of claim 1 wherein the fixture includes, a base secured to the bottom of the flange indentical in size and shape to the base of the lamp.

3. The apparatus of claim 2 wherein the flange includes openings for receiving electrical pins.

4. The apparatus of claim 1 including,
   a compensating lens compensating for the curvature of the center optic of the lantern lens when placed adjacent the outside thereof for providing an undistorted line of sight into the lantern lens.

5. A lamp focus fixture for inserting in a lamp holder in a lantern having a lens with lamp focusing indicator means for correctly adjusting the position of the lamp holder in the lens thereby insuring that a lamp in the holder is correctly aligned in the lens comprising:
   a flange sized and shaped in circumference and thickness equal to the flange of a lamp whereby the fixture flange will fit into the lamp holder in the same position as the lamp; and
   a sighting indicator secured to the flange and spaced from the bottom of the flange a distance equal to the distance from the midpoint of the filament to the bottom of the flange of the lamp.

6. The apparatus of claim 5 wherein the sighting indicator is spaced 1⅛ inches from the bottom of the flange.

7. The apparatus of claim 5 including,
   a base secured to the bottom of the flange of the same size and shape as the base of a lamp to be inserted in the holder.

8. The apparatus of claim 7 wherein the flange includes electrical pin holding openings.

9. In combination with a lantern having a lens with a focal plane and a lamp holder adjustably mounted therein, an apparatus for aligning the lamp holder comprising,
   a focus fixture comprising,
      a mounting flange sized and shaped to fit in the lamp holder in place of a lamp,
      a sighting indicator secured to the flange and spaced from the bottom of the flange a distance equal to the distance from the midpoint of the filament to the bottom of the flange of a lamp adapted to be secured in the lamp holder,
      a focusing telescope adapted to be aligned in the focal plane of the lens for aligning the sighting indicator and thus the lamp holder in the lens.

10 The apparatus of claim 9 wherein the telescope includes crosshairs located on the line of sight.

11. The apparatus of claim 9 wherein the telescope includes a base contoured to match the exterior surface of the center optic of the lens.

12. The apparatus of claim 9 including,
   a compensating lens compensating for the curvature of the center optic of the lantern lens thereby providing an undistorted line of sight into the lantern lens.